US008204676B2

(12) United States Patent
Tanabe (10) Patent No.: US 8,204,676 B2
(45) Date of Patent: Jun. 19, 2012

(54) NAVIGATION APPARATUS (75) Inventor: Atsushi Tanabe, Anjo (JP)

(73) Assignee: DENSO CORPORATION, Kariya (JP)

( * ) Notice: Subject to any disclaimer, the term of this patent is extended or adjusted under 35 U.S.C. 154(b) by 852 days.

(21) Appl. No.: 12/230,348

(22) Filed: Aug. 28, 2008

(65) Prior Publication Data
US 2009/0063043 A1 Mar. 5, 2009

(30) Foreign Application Priority Data

Sep. 5, 2007 (JP) ................. 2007-230546

(51) Int. Cl.
G06Q 30/00 (2012.01)
(52) U.S. Cl. ............... 701/209; 705/26; 705/27
(58) Field of Classification Search .......... 701/209; 705/26, 27
See application file for complete search history.

(56) References Cited

U.S. PATENT DOCUMENTS

| 2002/0100802 | A1* | 8/2002 | Sehr | 235/384 |
| 2002/0183924 | A1* | 12/2002 | Yokota | 701/209 |
| 2007/0225898 | A1* | 9/2007 | Pfleging et al. | 701/201 |
| 2008/0078831 | A1* | 4/2008 | Johnson et al. | 235/380 |

FOREIGN PATENT DOCUMENTS

| JP | A-09-097007 | 4/1997 |
| JP | A-2001-304893 | 10/2001 |
| JP | A-2002-288680 | 10/2002 |
| JP | A-2004-144584 | 5/2004 |
| JP | A-2004-233056 | 8/2004 |
| JP | A-2006-259419 | 9/2006 |
| JP | A-2007-057373 | 3/2007 |
| JP | A-2007-172432 | 7/2007 |
| JP | A-2007-205839 | 8/2007 |

OTHER PUBLICATIONS

Dash Navigation Taps Tele Atlas for Industry-Leading Digital Map Data; Dash to Provide Automatic Over-the-Air Updates to Dash Express Users From Tele Atlas' Comprehensive MultiNet Digital Map Database, PR Newswire. New York: Nov. 16, 2006, downloaded from ProQuestDiret on the Internet on Feb. 17, 2012, 3 pages.*
Office Action issued on May 31, 2011 in the corresponding Korean patent application No. 10-2008-0084083.
Office Action dated Aug. 31, 2010 in corresponding KR application No. 10-2008-0084083.
Office Action dated Sep. 1, 2009 from Japan Patent Office in corresponding JP application No. 2007-230546.
Notification of Re-Examination Result dated Oct. 26, 2011 in corresponding KR Application No. 10-2008-0084083.

* cited by examiner

Primary Examiner — James Zurita
(74) Attorney, Agent, or Firm — Posz Law Group, PLC (57) ABSTRACT A navigation apparatus in a vehicle acquires use history information relative to electronic money payment from an electronic money payment apparatus such as an IC card or a cellular phone. The use history information includes detail information such as position information, a name, and a corresponding terminal ID with respect to an electronic money used facility, in which electronic money payment is made. The detail information is used as a key word to designate a position of the electronic money used facility. The designated position of the used facility can be then displayed as a mark for indicating an electronic money used facility on a map displayed in a display device. This enables a discernible display of the position of the electronic money used facility.

16 Claims, 5 Drawing Sheets

| USE HISTORY | NAME | NONE | ▷ | ⤺RETURN |
|---|---|---|---|---|
| | GENRE | NONE | | |

[DISTANCE ORDER] [NAME ORDER]   ITEMS : 200 [NARROW DOWN]

| △PREVIOUS | A GAS STATION / X STREET W CITY | ▷ |
|---|---|---|
| ⇞ ALPH. | B CONVENIENCE STORE / Y STREET | ▷ |
| ⇟ ALPH. | B GAS STATION / Z STREET W CITY | ▷ |
| ▽ NEXT | C CONVENIENCE STORE / X STREET | ▷ |

FIG. 7B

USE HISTORY   NAME   NONE   ▷  ⤺RETURN

🔍 NARROW DOWN                    ⤺RETURN

| NAME | NONE |
|---|---|
| GENRE | CONVENIENCE STORE |
| DATE | 2006/10/1 |

DESIGNATE GENRE & DATE

FIG. 7C

| USE HISTORY | NAME | NONE | ▷ | ⤺RETURN |
|---|---|---|---|---|
| | GENRE | CONVENIENCE STORE | | |
| | | DATE : 206/10/01 | | |

[DISTANCE ORDER] [NAME ORDER]         ITEMS : 2

| △PREVIOUS | B CONVENIENCE STORE / Y STREET | ▷ |
|---|---|---|
| ⇞ ALPH. | C CONVENIENCE STORE / X STREET | ▷ |
| ⇟ ALPH. | | |
| ▽ NEXT | | |

NAVIGATION APPARATUS

CROSS REFERENCE TO RELATED APPLICATION

This application is based on and incorporates herein by reference Japanese Patent Application No. 2007-230546 filed on Sep. 5, 2007.

FIELD OF THE INVENTION

The present invention relates to a navigation apparatus for a vehicle.

BACKGROUND OF THE INVENTION

In recent years, electronic money or electronic money payment has been popular using an IC card, a cellular phone, or the like. When an IC card or cellular phone is used to make an electronic money payment for goods or services, such use history regarding the electronic money payment is recorded to be referred to thereafter for improving convenience of users.

For instance, Patent document 1 discloses a cellular phone having a contactless IC card processor and a GPS receiver; the cellular phone acquires using the GPS receiver the present position where the electronic money is used by the contactless IC card processor and records the acquired present position as a use position in a use history database. While accessing a map provider via the Internet to retrieve map information, the cellular phone thereby displays on a main display window a map discernibly including the use position read from the database. This allows a user to confirm the use position where the electronic money is used.

In Patent document 1, the cellular phone needs to contain a GPS receiver to detect a use position where electronic money is used. Furthermore, the cellular phone needs to contain a display in order to visually confirm the use position.

Patent document 1: JP-2006-259419A

SUMMARY OF THE INVENTION

It is an object to provide a vehicular navigation apparatus for displaying positions of electronic money used facilities on a map. More users thus easily confirm the positions of the electronic money used facilities.

According to an embodiment to the present invention, a navigation apparatus for a vehicle is provided as follows. Use history information relative to electronic money is acquired from an electronic money payment apparatus, which has an electronic money payment function while storing the use history information. A position of a used facility, where electronic money payment is made, is designated based on the acquired use history information. Map data is stored. A display device is configured to display a map using the stored map data. A mark, which indicates the used facility, is displayed in the designated position on the displayed map.

According to another example of the present invention, a method is provided for displaying an electronic money used facility in a navigation apparatus for a vehicle. The method comprises: (i) storing map data; (ii) acquiring use history information relative to electronic money from an electronic money payment apparatus, which has an electronic money payment function while storing the use history information; (iii) designating a position of the used facility, where electronic money payment is made, based on the acquired use history information; and (iv) displaying a mark, which indicates the used facility, in the designated position on a map, which is displayed using the stored map data in a display device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
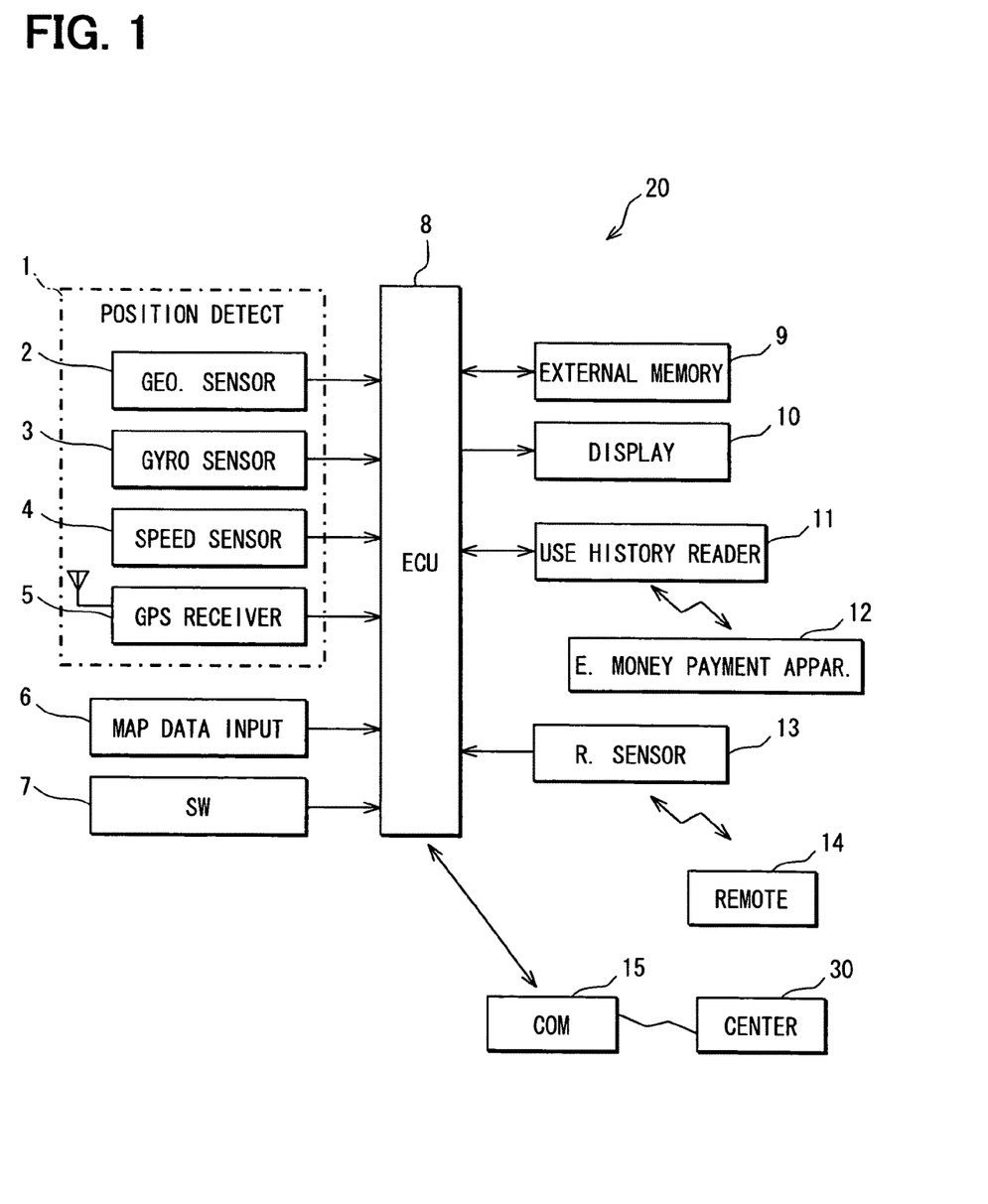
FIG. 1 is a block diagram illustrating an overall configuration of a navigation apparatus according to an embodiment of the present invention.

Hereafter, a navigation apparatus according to an embodiment of the present invention is explained with reference to drawing. FIG. 1 is a block diagram illustrating an overall configuration of the navigation apparatus 20 provided in a subject vehicle. The navigation apparatus 20 includes the following: a position detection device 1, a map data input device 6, an operation switch group 7, an external memory 9, a display device 10, a use history information reader 11, a remote control sensor 13, and a navigation ECU 8 (Electronic Control Unit) as a control device or circuit coupled with the foregoing.

The navigation ECU 8 is a usual computer to contain a CPU, a ROM, a RAM, an I/O, and a bus line connected with the foregoing. A program for the ECU 8 is written in the ROM. Based on the program, the CPU or the like executes predetermined data processing.

The position detection device 1 includes following known sensors or the like: a geomagnetic sensor 2, a gyroscope 3, a speed (or distance) sensor 4 for calculating a travel distance, and a GPS receiver 5 for GPS (Global Positioning System) which detects a present position of the vehicle based on electric waves from satellites. The individual sensors have different types of detection errors from each other; therefore, they are used to complement each other. In addition, the position detection device 1 may be constructed of a part of the above sensors depending on the accuracy of each sensor.

The map data input device 6 functions as an example of a storage means for storing map data and is used to input into the ECU 8 the following data: road map data for displaying road maps; map data such as map matching data for improving accuracy of a position of the vehicle; a facility retrieval database including information on facilities on maps such as types, genres, positions, names, and addresses; facility mark data for displaying various facilities; and images or audio data for guidance. The above data can be stored in a rewritable storage medium such as a hard disk drive or memory card.

The operation switch group 7 includes a touch sensitive panel prepared on a screen or window in the display device 10 mentioned later, and is used for various input operations in combination with display information in the display device 10. For example, an icon for changing a scale of a displayed map is illustrated in the display device 10, and the scale of the display map can be changed by touching a position corresponding to the icon. An intended information item can be selected from multiple candidate information items displayed in the display device 10. An address or phone number can be inputted as information for narrowing down facilities to retrieve a destination.

The navigation apparatus 20 includes a route retrieval function and a navigation or route guidance function (means or portion). When a predetermined facility is designated as a destination via the operation switch group 7 etc., a guidance route to reach the destination is retrieved. When a user requires the start, the navigation or route guidance is executed along the retrieved route.

The external memory 9 has a rewritable (or read/write) storage medium such as a memory card and is used for storing the various data such as text data, image data, and a translation table to be explained later.

The display device 10 includes a liquid crystal display, for example, and is caused by the ECU 8 to display on a display screen a vehicle mark indicating a present position of the vehicle inputted from the position detection device 1 and a road map surrounding the present position generated based on map data from the map data input device 6.

The use history information reader 11 includes a communication device which has a communication function to communicate with an IC card, an IC card reader, or a cellular phone, for example, in a wired or wireless manner. The use history information reader 11 thereby reads use history information relative to electronic money from the IC card or cellular phone as an electronic money payment apparatus 12 having an electronic money payment function and a storage function of electronic money use history information. The electronic money payment apparatus 12 communicates with a terminal provided in an electronic money usable facility (or shop) in a contactless or wireless manner to thereby execute a payment process for goods or service. In such a case, the electronic money payment apparatus 12 records use history information including a name of the facility where the electronic money payment is made, a time and date of making the electronic money payment, a used money amount, an ID indicating the terminal of the facility, or the like.

The remote control sensor 13 receives an operation signal from the remote control terminal 14 (also called "remote") wirelessly. The remote control terminal 14 is used for various inputs similarly with the operation switch group 7.

Figure 2:
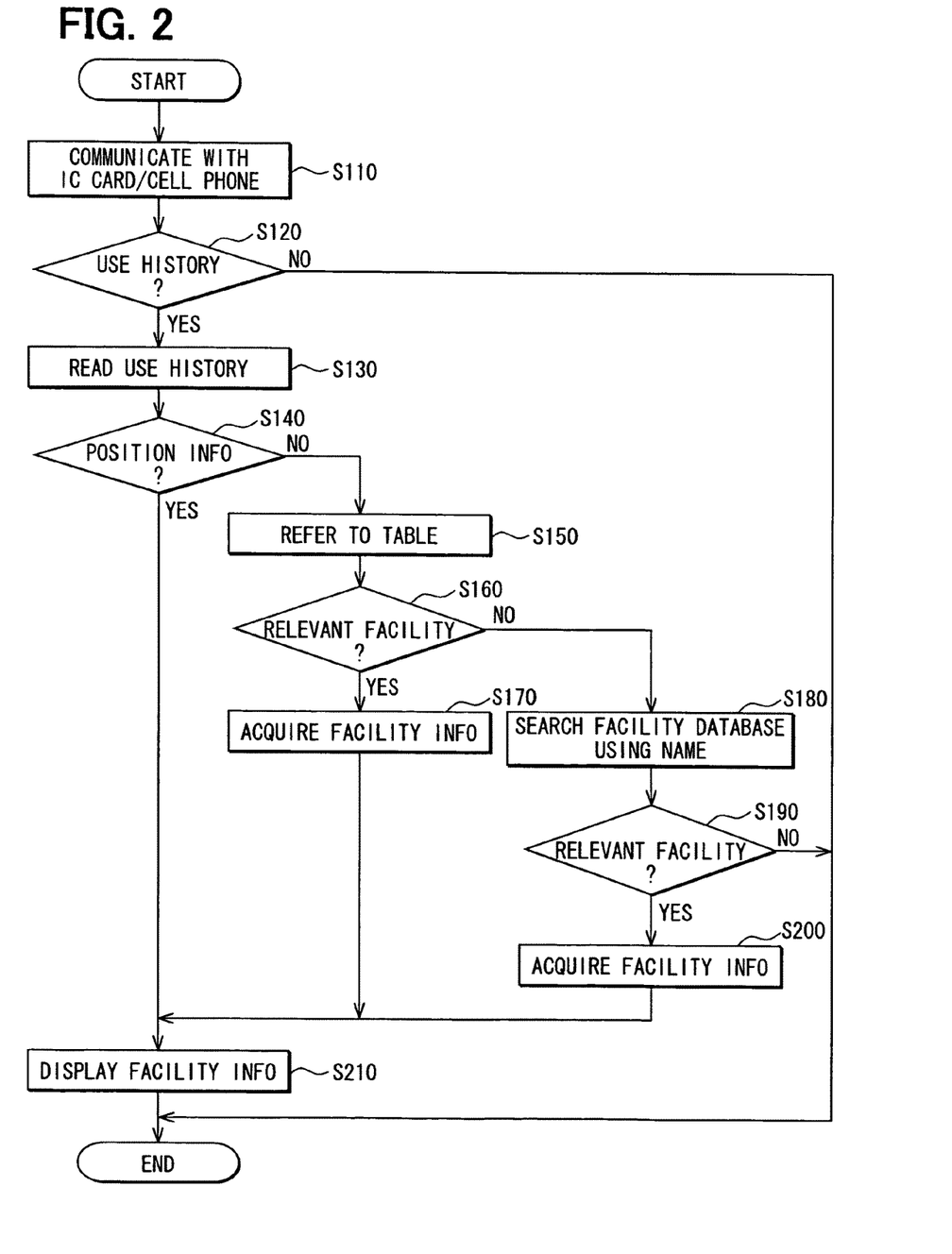
FIG. 2 is a flowchart illustrating a process for displaying a position of an electronic money used facility on a map.

Next, a process for displaying on a map a position of a used facility where electronic money is used or available is explained in detail using a flowchart of FIG. 2. The process is executed by the ECU 8 of the navigation apparatus 20.

First, at S110, the use history information reader 11 communicates with an electronic money payment apparatus 12 such as an IC card or a cellular phone. At S120, it is determined whether the use history information relative to electronic money is stored in the electronic money payment apparatus 12. When it is determined that the use history information is stored, the processing proceeds to S130. In contrast, when it is determined that the use history information is not stored, displaying an electronic money used facility cannot be possible so that the process ends.

At S130, the use history information stored in the electronic money payment apparatus 12 is read via the use history information reader 11. Herein, the ECU 8 functions as an example of a use history information acquisition means or portion. At S140, it is determined whether position information indicating positions of the used facilities is included in the read use history information. For example, when installing the terminal for the payment process of the electronic money in the shop etc., the position information corresponding to the position of the shop is memorized in the terminal in a data form such a latitude and longitude, an address, a map code, etc. When the terminal communicates with the electronic money payment apparatus 12 for the payment process of the electronic money, the position information in the terminal can be transmitted to the electronic money payment apparatus 12 as one of the use history information. The position information can be thus included in the use history information stored in the electronic money payment apparatus 12. The use history information includes a use date and time, a used money amount, a shop name as a facility name, a name of purchased goods and service, and a terminal ID (identification).

When it is determined at S140 that the position information is not included in use history information, the processing proceeds to S150. At S150, the ECU 8 refers to a translation table which associates terminal IDs with position information on positions of facilities corresponding to the terminal IDs. The terminal IDs are usually contained in the use history information. In addition, the translation table or a storage medium storing the translation table may be provided in the navigation apparatus 20 or in an external management center 30 when the navigation apparatus 20 includes a communication device 15 to communicate with the external management center 30. When the translation table is stored in the management center 30, the navigation apparatus 20 may acquire the table itself directly or once transmit information on terminal IDs to the management center 30 to thereby acquire the position information corresponding to the terminal IDs.

At S160, it is determined by referring to the translation table whether position information corresponding to the terminal IDs is acquirable. Herein, when the position information corresponding to the terminal IDs is registered in the translation table and it is thus determined that position information is acquirable, the processing proceeds to S170. At S170, the position information on facilities is acquired using the translation table at least. In addition, when information other than the position information of the facilities is registered in the translation table, the information is acquired collectively.

In contrast, at S160, when it is determined that position information is not acquirable, for instance, when the position information corresponding to terminal IDs is not registered in the translation table, the processing proceeds to S180. At S180, the ECU 8 tries to retrieve position information on facilities using the facility retrieval database provided in the navigation apparatus 20 itself. That is, the use history information relative to electronic money includes the name information of names of the used facilities; therefore, position information corresponding to the relevant facilities can be usually retrieved from the facility retrieval database with the facility names as a retrieval key word.

At S190, it is determined whether information on the relevant facilities is retrieved using the facility names in the retrieval database. For example, when a certain facility is built newly and is not included in the facility retrieval database, information on the certain facility cannot be retrieved using the facility name. In such a case, since there is no means to acquire facility information including the facility position corresponding to the certain facility, the process illustrated in FIG. 2 ends with respect to the certain facility. In contrast, when it is determined that information on the relevant facility or facilities is retrieved, the processing proceeds to S200, where the facility information is acquired from the facility retrieval database. Thus, the ECU 8 functions as an example of a position designation means or portion for designating a position of a used facility in the process from S140 to S200.

Figure 4:
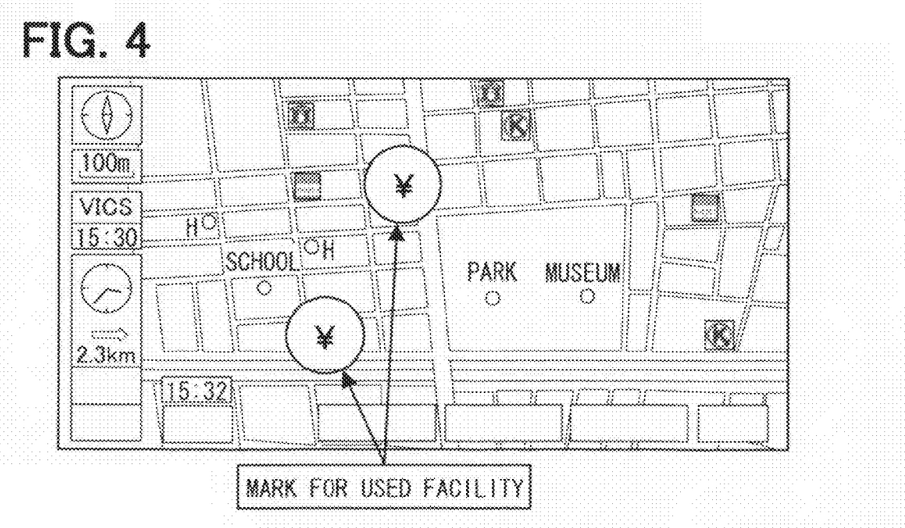
FIG. 4 is a display example illustrating a facility where electronic money is used.

At S210, each used facility mark for indicating the relevant facility is displayed on the map based on the acquired facility information, especially position information. Thus, herein, the ECU 8 functions as an example of a display management means or portion for displaying the mark. FIG. 4 shows an example of a display of facilities where electronic money is used. In FIG. 4, the facility positions where the electronic money is used are displayed by illustrating a "¥" mark on the map. However, such a "¥" mark does not teach a kind (genre) to which a used facility belongs or a name of the used facility; therefore, detailed information of the facility may be displayed based on an operation of touching the displayed facility position in the screen of the display device 10. Thus, herein, the ECU 8 functions as an example of a selection operation means or portion for performing a selection operation for selecting the mark on the displayed map.

Figure 5:
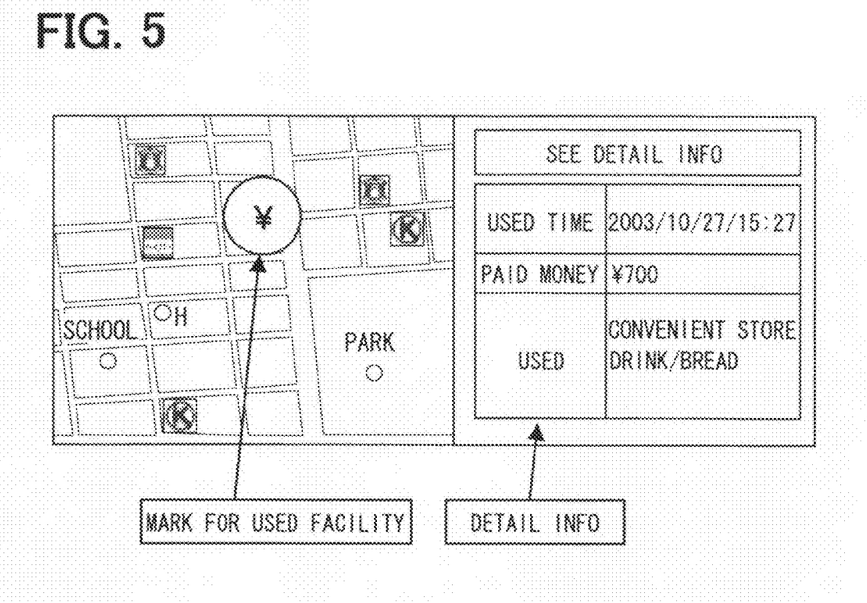
FIG. 5 is a first display example illustrating detail information relative to an electronic money used facility.
Figure 6:
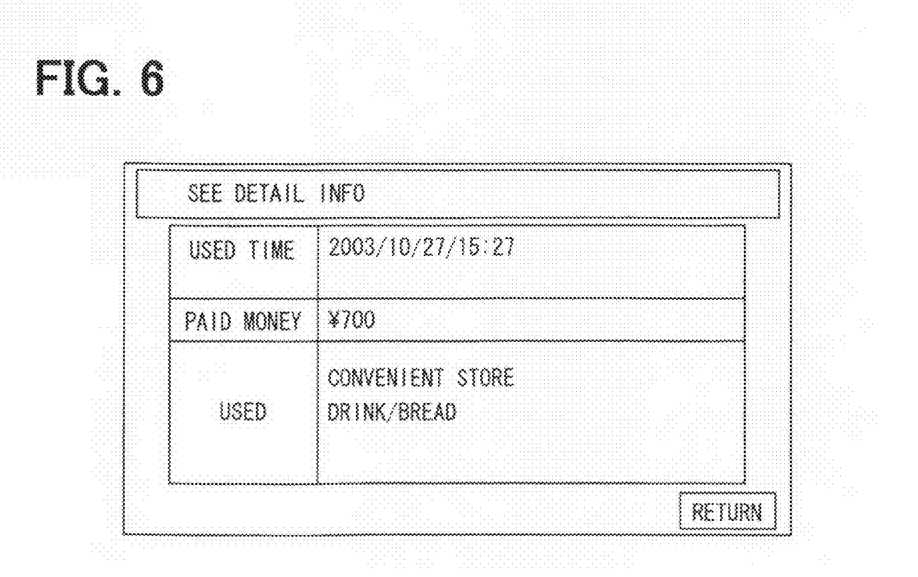
FIG. 6 is a display example illustrating detail information relative to an electronic money used facility.

FIG. 5 and FIG. 6 illustrate display examples of the detail information of electronic money used facilities. In the example illustrated in FIG. 5, the display screen is divided into two left and right sections. The detail information of a facility including a use time, a money amount, a genre or name of a facility, and purchased goods is displayed on the right section of the screen while the map is displayed on the left section of the screen. In addition, in FIG. 6, the detail information of the facility is displayed on the full screen of the display device 10. Based on either FIG. 5 or FIG. 6, a user can see the detail information of the used facility and check when the facility is used and what kind of facility was used. Further, this can provide useful information if the user determines a facility to desirably visit.

In addition, the display screen displaying the detail information in FIG. 5 and FIG. 6 can further include or illustrate a setting switch for setting the relevant facility as a destination. This simplifies an operation to set the facility as a destination when a user wants to visit the facility of which detail information is presently displayed. In addition, it can be designed that touching the used facility directly sets the used facility as a destination.

In addition, when the use history information is read from the electronic money payment apparatus 12, information on the used facilities may be displayed in a list first, before superimposing the used facility on the map. Such a configuration can be preferable when the use history information includes information on multiple used facilities. The user can select a used facility from the multiple candidate facilities.

Figure 7A:
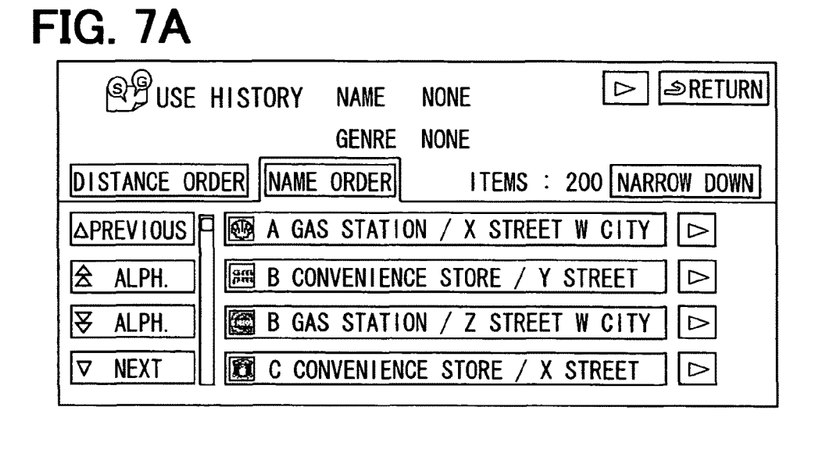
FIG. 7A is a display example illustrating a list of electronic money used facilities in facility name-based alphabetic order.

FIG. 7A illustrates a display example which display as a list of information on used facilities. In the example illustrated in FIG. 7A, a facility name and a part of a facility address are included. In addition, in FIG. 7A, the facility names are displayed in alphabetical order. Such a configuration allows a user to easily find a facility when remembering the name of the facility which the user wants to display on the map.

In addition, in the example illustrated in FIG. 7A, the information on used facilities can be displayed in ascending order of distances from the present position based on an touch operation of pressing the icon of "DISTANCE ORDER." Thus, the ECU 8 can switch an order of the list between an alphabetical order of used facilities names and an ascending order of distances of positions of the used facilities from the present position. When the used facilities are thus displayed from the nearest, the user can select the used facility easy to access from the present position.

Figure 7B:
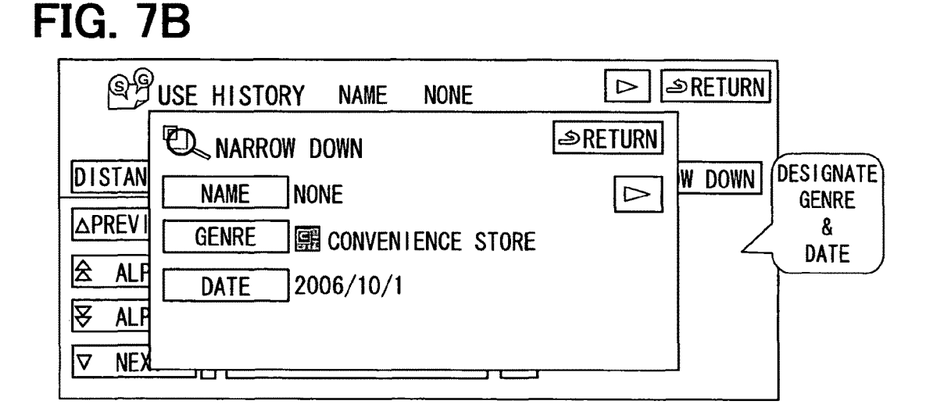
FIG. 7B is a display example for setting retrieval conditions for narrowing down electronic money used facilities.

In addition, in the example of a condition setting window illustrated in FIG. 7A, it is possible to narrow down (or shortlist) used facilities in the list to meet a predetermined condition by pressing "NARROW DOWN." For example, as illustrated in FIG. 7B, a facility name, a facility genre, and a use date can be used as the condition for narrowing down. In addition, a range of a money amount can be used as the condition for narrowing down.

Figure 7C:
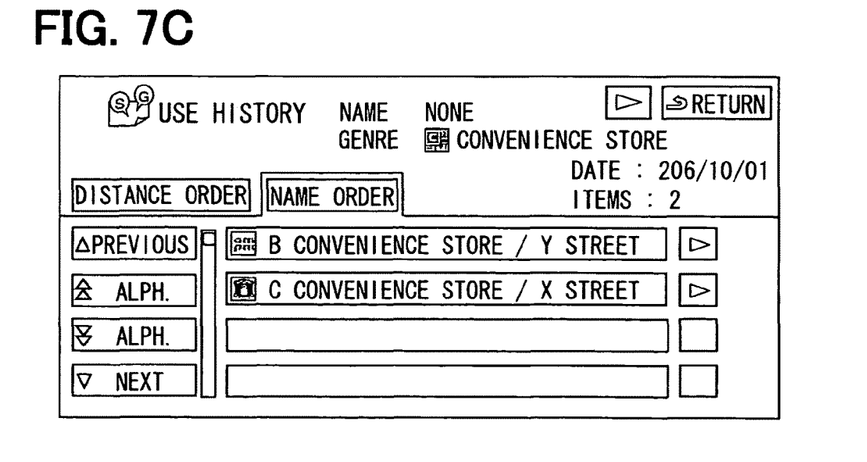
FIG. 7C is a display example of a list of electronic money used facilities meeting retrieval condition.

For example in the condition setting window of FIG. 7B, the genre and use date are designated or inputted as "CONVENIENCE STORE" and "2006/10/1" while the name is not designated ("NONE"). In such a case, as shown in FIG. 7C, only the facilities meeting the above condition are displayed; thus, it becomes easier for the user to retrieve a desired used facility.

Even if a user forgets the name of the facility the user wants to display it on the map, the user may remember when the facility is used, how much electronic money amount is paid or used, or what kind of genre the facility belongs to. Thus, when a condition can be set based on a use date or time, a money amount used, a facility genre, etc., a user can extract a desired facility much faster and much easier. Thus, herein, the ECU 8 functions as an example of a condition setting mans or portion for setting a condition.

In addition, in the process illustrated in the flowchart of FIG. 2 mentioned above, when at least the information about the name and position of the used facility is able to be acquired from the use history information without using the retrieval database, the retrieval database can be updated based on the acquired information. When a new facility is built, or when a facility is changed in a genre or the like, the facility information registered in the retrieval database may not accord with the information of the actual present facility. Therefore, the retrieval database can be updated with respect to the same facility based on the facility name and facility position, which are acquired from the use history information, when it is determined that the difference exists in the information registered in the retrieval database after comparing with that of the use history information.

Figure 3:
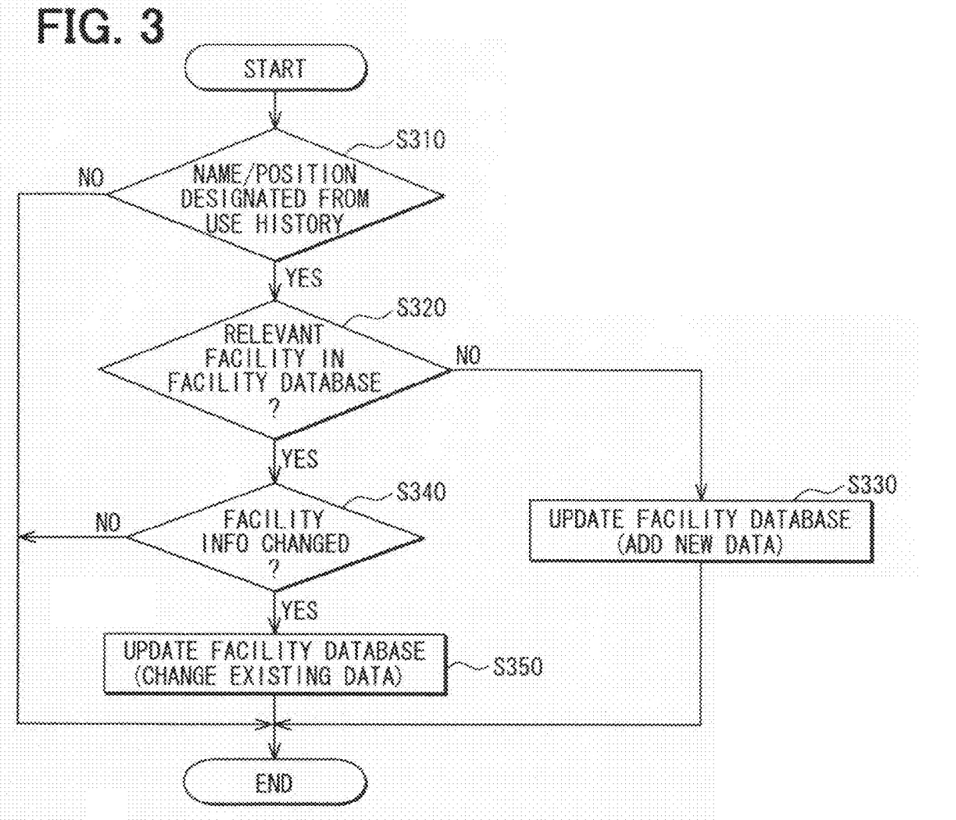
FIG. 3 is a flowchart illustrating a process for updating a retrieval database based on a facility name and facility position which are designated from use history information.

For instance, as illustrated in a flowchart of FIG. 3, it is first determined at S310 whether the information about the name and position of the used facility are acquired at least from the use history information, without using the retrieval database. When the determination at S310 is affirmed, the processing proceeds to S320, where it is determined whether the relevant facility is registered in the retrieval database mainly based on whether the individual facility positions accord with each other.

When the information on the relevant facility is not registered in the retrieval database, the processing proceeds to S330, where the retrieval database is updated by adding the information on the relevant facility to the retrieval database as the information on the new facility. In contrast, when the information on the relevant facility is registered in the retrieval database, the processing proceeds to S340. At S340, it is determined whether any change is found in the facility information by contrasting the information between the acquired information and the registered information. When the determination at S340 is affirmed, the processing proceeds to S350, where the retrieval database is updated by changing the existing information on the relevant facility in the retrieval database according to the acquired information on the relevant facility. Thus, in the process at S330, S350, the ECU 8 functions as an example of an update means or portion for updating the retrieval database.

This allows the retrieval database to be maintained as being in a most recent state with respect to the electric money used facility the user uses.

As explained above, according to the navigation apparatus of the present embodiment, the position of the used facility can be displayed on the map based on the use history information stored in the electronic money payment apparatus 12. That is, the use history information includes information used as a key word to designate a position of the used facility such as position information, a name, a corresponding terminal ID, etc. Thus, the position of the used facility can be designated based on the use history information. Therefore, it is possible to display the mark which illustrates the electronic money used facility on the position designated on the display map in the navigation apparatus. The user can thus easily recognize the position of the used facility.

The preferred embodiment of the present invention is thus described; however, without being restricted to the embodiment mentioned above, the present invention can be variously modified as long as not deviating from the scope thereof.

For example, the embodiment mentioned above displays unconditionally the mark which illustrates the used facility of the electronic money. However, it can be designed that a user may determine whether to display it as needed.

In addition, used facilities included in the use history information may be registered as a facility the user frequently uses in the navigation apparatus. Under such a configuration, even if the use history information is not read again from the electronic money payment apparatus, it is possible to easily display the used facility on the map or set it as a destination.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a navigation apparatus for a vehicle is provided as follows. A use history information acquisition means is configured to acquire use history information relative to electronic money from an electronic money payment apparatus, which has an electronic money payment function while storing the use history information. A position designation means is configured to designate a position of a used facility, where electronic money payment is made, based on the acquired use history information. A storage means is configured to store map data. A display device is configured to display a map using the stored map data. A display management means is configured to display a mark, which indicates the used facility, in the designated position on the displayed map.

The electronic money payment apparatus including such an IC card or a cellular phone communicates in a contactless or wireless manner with a terminal provided in a shop as a facility and makes an electronic payment for goods or service using so-called electronic money. In such a case, the electronic money payment apparatus records use history information including a name of the facility where the electronic money payment is made, a time and date of making the electronic money payment, a used electronic money amount, an ID indicating the terminal of the facility, or the like. The above navigation apparatus acquires the use history information from the electronic money payment apparatus, for example, using the use history information acquisition means, such as a card reader and a communication device. The acquired use history information includes a key word to designate the position of the used facility, including the facility name, terminal ID, etc. Thus, the position of the used facility can be designated based on the use history information. Therefore, it is possible to arrange the mark, which illustrates the electronic money used facility, in the designated position on the displayed map of the navigation apparatus. The user can thus easily recognize the position of the used facility.

As an optional aspect, the navigation apparatus may further include a selection operation means for performing a selection operation for selecting the mark on the displayed map. Herein the display management means may be configured to display facility information relative to a used facility corresponding to the selected mark. The facility information relative to the used facility may include a use time/date, a used money amount, a genre of the used facility, a product name, etc. Displaying such information allows a user to confirm when the user used a facility or what kind of facility the user used, thus providing the user with useful information for determining a desirable facility to visit.

As an optional aspect, the navigation apparatus may further include a navigation means for retrieving a guidance route including as a destination the used facility corresponding to the selected mark and navigating the vehicle along the retrieved guidance route. Thereby, it enables the user to arrive at the selected facility easily.

When the position of the used facility is designated based on the use history information relative to the electronic money, some different techniques can be adopted. As an optional aspect, when the use history information includes position information on a position of the used facility, the position designation means may be configured to designate the position of the used facility using the position information included in the use history information.

As an optional aspect, when the use history information includes ID information indicating a terminal through which the payment using the electronic money is made in the used facility, the position designation means may be configured to designate a position of the used facility by referring to a table associating position information on the position of the used facility with the ID information indicating the terminal in the used facility. Herein, the navigation apparatus may further include a table storage means for storing the table. Alternatively, a table storage means for storing the table may be provided in an external management center outside of the vehicle. When the table is stored in the management center, the navigation apparatus can designate the position of the used facility by communication with the management center by acquiring the table or the position information of the used facility corresponding to ID information.

Further, as an optional aspect, the navigation apparatus may further include a storage medium storing a retrieval database allowing search for a position using a facility name; and an update means for updating the retrieval database based on a facility name of a used facility and a position of the used facility when the facility name is included in the use history information and the position of the used facility is designated by the position designation means. When a new facility is built, or when a facility is changed in a genre or the like, the facility information registered in the retrieval database may not accord with the information of the actual facility. Therefore, the retrieval database can be updated with respect to the same facility based on the facility name and facility position, which are acquired from the use history information, when the difference exists in the information registered in the retrieval database as a result of comparison.

As an optional aspect, the navigation apparatus may further include a storage medium storing a retrieval database allowing search for a position using a facility name. Herein, when the use history information includes name information on a name of the used facility, the position designation means may be configured to designate a position of the used facility using the name information included in the use history information by searching the retrieval database.

As an optional aspect, the display management means may be configured to perform a list display of displaying in a list of information relative to a used facility in the display device based on the acquired use history information; and the display management means may be configured to display on the display device a map including a mark indicating a used facility corresponding to the information selected from the list. Under such configuration, when the use history information includes information relative to multiple used facilities, a desired facility can be easily selected.

As an optional aspect, the display management means may be configured to switch an order of the information in the list between an alphabetical order of facility names and an ascending order of distances to a present position with respect to used facilities corresponding to the information included in the list. Such configuration allows a user to easily find a facility when remembering the name of the facility which the user wants to display on the map. Further, when the used facilities are displayed from the closest to the present position, the user can select the facility easy to access from the present position.

As an optional aspect, the navigation apparatus may further include a condition setting means for setting a condition among at least a date when electronic money is used, a money amount paid using the electronic money, and a genre to which a used facility belongs, for determining a used facility, which is displayed in the list. Herein the display management means may be configured to perform the list display to include a used facility satisfying the set condition. A user may forget the facility name of a facility the user wants to display on a map. In contrast, the user may remember when the user used the facility, how much the user used or paid, or what kind of genre the used facility belongs. Therefore, facilities in the list can be narrowed down by setting a condition by using at least one of a used date, a used money amount, a facility genre. The user can thus easily retrieve a desired facility.

As another aspect of the disclosure, a method is provided for displaying an electronic money used facility in a navigation apparatus for a vehicle. The method comprises: (i) storing map data; (ii) acquiring use history information relative to electronic money from an electronic money payment apparatus, which has an electronic money payment function while storing the use history information; (iii) designating a position of the used facility, where electronic money payment is made, based on the acquired use history information; and (iv) displaying a mark, which indicates the used facility, in the designated position on a map, which is displayed using the stored map data in a display device.

It will be obvious to those skilled in the art that various changes may be made in the above-described embodiments of the present invention. However, the scope of the present invention should be determined by the following claims.

What is claimed is:

1. A navigation apparatus in a vehicle, the navigation apparatus comprising:
    a use history information acquisition portion for acquiring use history information relative to electronic money from an electronic money payment apparatus, which has an electronic money payment function while storing the use history information;
    a position designation portion for designating a position of a used facility, where an electronic money payment is made, based on the acquired use history information;
    a map data input device for storing map data;
    a display device for displaying a map using the stored map data; and
    a display management portion for causing the display device to display a mark, which indicates the used facility, in the designated position on the displayed map, wherein
    when the use history information includes ID information indicating a terminal in the use facility in which payment using the electronic money is made, the position designation portion designates a position of the used facility by referring to a table associating position information related to the position of the used facility with the ID information indicating the terminal in the used facility,
    the navigation apparatus further comprises:
    a storage medium that stores a retrieval database that allows for searching for a position using a facility name; and
    an update portion for updating the retrieval database based on a facility name of a used facility and a position of the used facility when the facility name is included in the use history information and the position of the used facility is designated by the position designation portion.

2. The navigation apparatus according to claim 1, further comprising:
    a selection operation portion for performing a selection operation for selecting the mark on the displayed map,
    wherein the display management portion is configured to display facility information relative to a used facility corresponding to the selected mark.

3. The navigation apparatus according to claim 2, further comprising:
    a navigation portion for retrieving a guidance route including as a destination the used facility corresponding to the selected mark and navigating the vehicle along the retrieved guidance route.

4. The navigation apparatus according to claim 1, further comprising:
    a table storage medium for storing the table.

5. The navigation apparatus according to claim 1, wherein:
    an external management center outside of the vehicle includes a table storage medium for storing the table; and
    the position designation portion acquires either the table or the position information corresponding to the ID information included in the table by communicating with the external management center.

6. The navigation apparatus according to claim 1, wherein:
    the display management portion is configured to perform a list display of displaying in a list of information relative to a used facility in the display device based on the acquired use history information; and the display management portion is configured to display on the display device a map including a mark indicating a used facility corresponding to the information selected from the list.

7. The navigation apparatus according to claim 6, wherein the display management portion is configured to switch an order of the information in the list between an alphabetical order of facility names and an ascending order of distances to a present position with respect to used facilities corresponding to the information included in the list.

8. The navigation apparatus according to claim 6, further comprising:
a condition setting portion for setting a condition among at least a date when electronic money is used, a money amount paid using electronic money, and a genre to which a used facility belongs, for determining a used facility, which is to be displayed in the list,
wherein the display management portion is configured to perform the list display to include a used facility satisfying the set condition.

9. A method for displaying an electronic money used facility in a navigation apparatus for a vehicle,
the method comprising:
storing map data;
acquiring use history information relative to electronic money from an electronic money payment apparatus, which has an electronic money payment function while storing the use history information;
designating a position of the used facility, where electronic money payment is made, based on the acquired use history information; and
displaying a mark, which indicates the used facility, in the designated position on a map, which is displayed using the stored map data in a display device, wherein
when the use history information includes ID information indicating a terminal through which the payment using the electronic money is made in the used facility, a position of the used facility is designated by referring to a table associating position information on the position of the used facility with the ID information indicating the terminal in the used facility,
the method further comprising:
storing a retrieval database allowing search for a position using a facility name; and
updating the retrieval database based on a facility name of a used facility and a position of the used facility when the facility name is included in the use history information and the position of the used facility is designated.

10. A navigation apparatus for a vehicle, the navigation apparatus comprising:
a use history information acquisition portion for acquiring use history information relative to electronic money from an electronic money payment apparatus, which has an electronic money payment function while storing the use history information;
a position designation portion for designating a position of a used facility, where electronic money payment is made, based on the acquired use history information;
a map data input device for storing map data;
a display device for displaying a map using the stored map data; and
a display management portion for displaying a mark, which indicates the used facility, in the designated position on the displayed map, wherein
when the use history information includes position information on a position of the used facility, the position designation portion is configured to designate the position of the used facility using the position information included in the use history information,
the navigation apparatus further comprising:
a storage medium storing a retrieval database allowing search for a position using a facility name; and
an update portion for updating the retrieval database based on a facility name of a used facility and a position of the used facility when the facility name is included in the use history information and the position of the used facility is designated by the position designation portion.

11. The navigation apparatus according to claim 10, further comprising:
a selection operation portion for performing a selection operation for selecting the mark on the displayed map, wherein
the display management portion is configured to display facility information relative to a used facility corresponding to the selected mark.

12. The navigation apparatus according to claim 11, further comprising:
a navigation portion for retrieving a guidance route including as a destination the used facility corresponding to the selected mark and navigating the vehicle along the retrieved guidance route.

13. The navigation apparatus according to claim 10, wherein:
the display management portion is configured to perform a list display of displaying in a list of information relative to a used facility in the display device based on the acquired use history information; and
the display management portion is configured to display on the display device a map including a mark indicating a used facility corresponding to the information selected from the list.

14. The navigation apparatus according to claim 13, wherein
the display management portion is configured to switch an order of the information in the list between an alphabetical order of facility names and an ascending order of distances to a present position with respect to used facilities corresponding to the information included in the list.

15. The navigation apparatus according to claim 13, further comprising:
a condition setting portion for setting a condition among at least a date when electronic money is used, a money amount paid using electronic money, and a genre to which a used facility belongs, for determining a used facility, which is to be displayed in the list, wherein
the display management portion is configured to perform the list display to include a used facility satisfying the set condition.

16. A method for displaying an electronic money used facility in a navigation apparatus for a vehicle,
the method comprising:
storing map data;
acquiring use history information relative to electronic money from an electronic money payment apparatus, which has an electronic money payment function while storing the use history information;
designating a position of the used facility, where electronic money payment is made, based on the acquired use history information; and
displaying a mark, which indicates the used facility, in the designated position on a map, which is displayed using the stored map data in a display device, wherein
when the use history information includes position information on a position of the used facility, the position of the used facility is designated using the position information included in the use history information, the method further comprising:

storing a retrieval database allowing search for a position using a facility name; and updating the retrieval database based on a facility name of a used facility and a position of the used facility when the facility name is included in the use history information and the position of the used facility is designated.

* * * * *